March 9, 1965

F. C. REGGIO 3,172,398

LIQUID FUEL CONTROL SYSTEM

Original Filed Feb. 3, 1939

2 Sheets-Sheet 1

March 9, 1965

F. C. REGGIO 3,172,398

LIQUID FUEL CONTROL SYSTEM

Original Filed Feb. 3, 1939

2 Sheets-Sheet 2

United States Patent Office 3,172,398
Patented Mar. 9, 1965

3,172,398
LIQUID FUEL CONTROL SYSTEM
Ferdinando Carlo Reggio, P.O. Box 692, Norwalk, Conn.
Application July 27, 1943, Ser. No. 496,296, which is a continuation of application Ser. No. 254,355, Feb. 3, 1939. Divided and this application Sept. 21, 1953, Ser. No. 381,247
5 Claims. (Cl. 123—103)

This invention relates to liquid fuel control systems and more particularly to liquid fuel metering or regulating systems for combustion engines, this application being a division of my application Serial No. 496,296 filed July 27, 1943, and now abandoned which is a continuation of my application Serial No. 254,355 filed February 3, 1939, and now abandoned.

The invention is of particular significance in connection with aircraft propulsion powerplants which present complex control problems due to the wide range of variations in operating conditions to which they are subject, such as ambient atmospheric pressure, temperature, speed and load.

An object of my invention is to provide a control device for automatically varying the rate of liquid fuel flow in the powerplant in response to changes in a combination of various operating conditions.

Another object is to provide a control device for combustion powerplant which automatically varies the rate of liquid fuel flow to secure optimum ratio between fuel flow and air flow under varying operating conditions and maintain the temperature level of the powerplant within safe limits.

The above and other objects of the invention will be apparent as the description proceeds; and while I have illustrated and described the preferred embodiments of the invention as they now appear to me, it will be understood that such changes may be made as fall within the scope of the appended claims. In the following description and in the claims various details will be identified by specific names for convenience, but they are intended to be as generic in the application as the art will permit.

Figure 1:
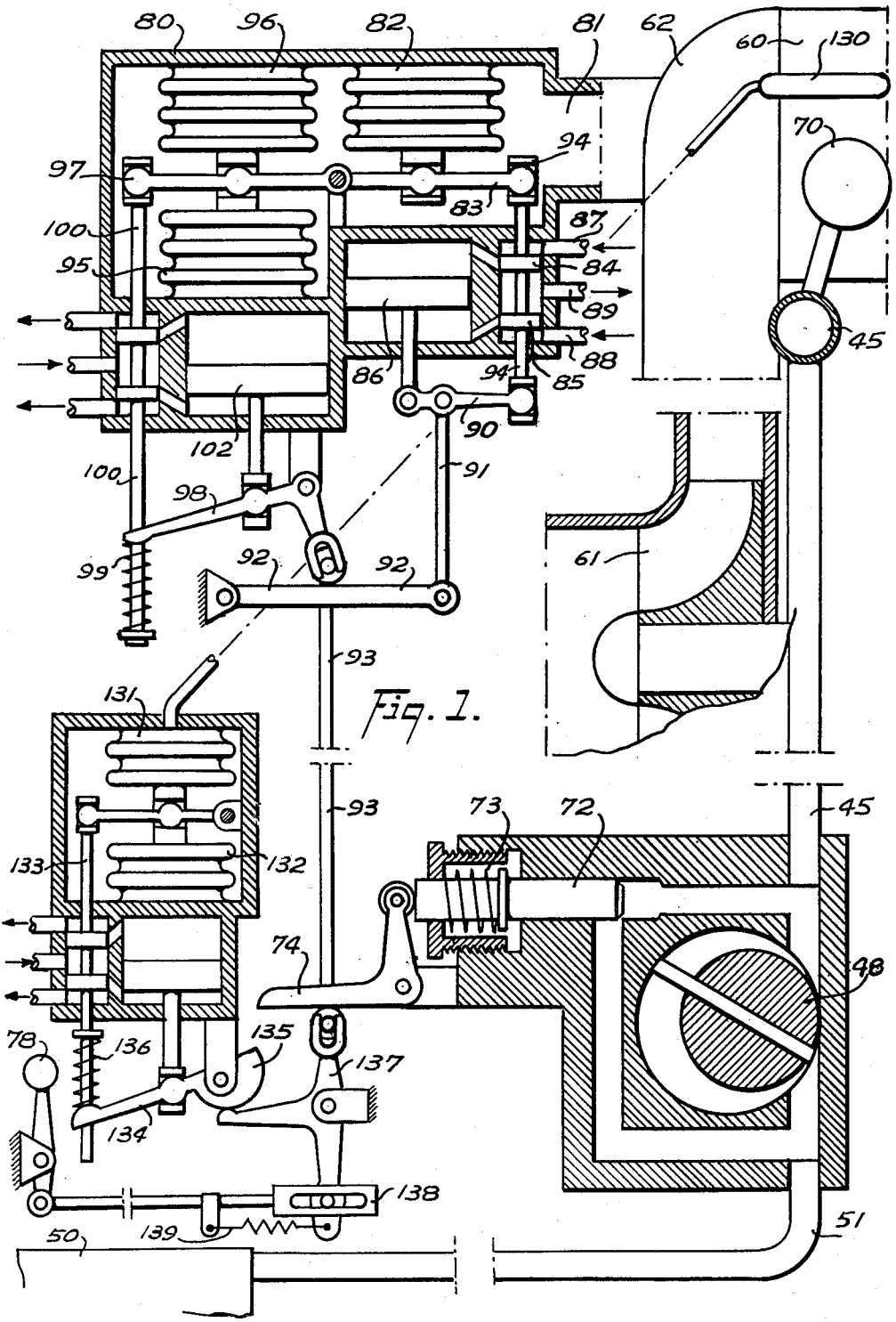
Figure 2:
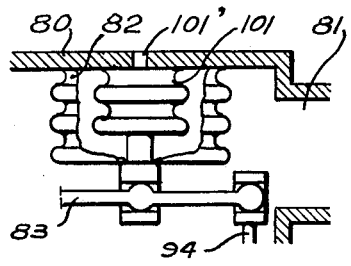
Figure 3:
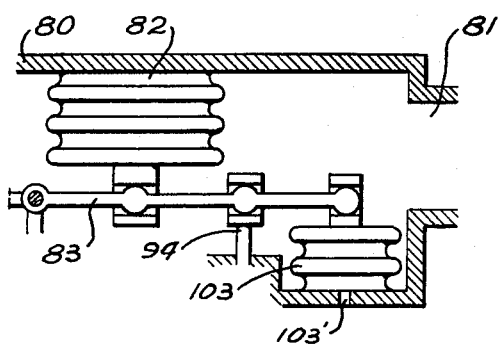
Figure 4:
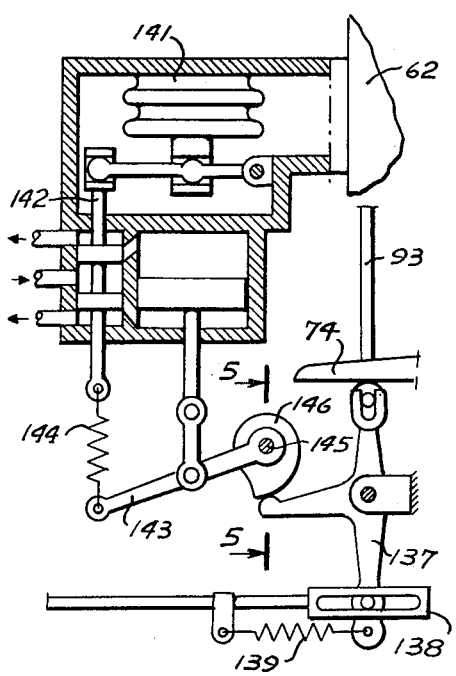

In the drawings, FIGURE 1 is a sectional elevation of a fuel flow control system according to the invention, FIGURE 2 indicates a modification in the component for sensing variations of powerplant air flow. FIGURE 3 shows a further modification in the same component, FIGURE 4 shows a component responsive to variations of pressure in the compressor section of the powerplant, FIGURE 5, in part a section along line 5—5 of FIGURE 4, indicates a speed-responsive component, and FIGURE 6 indicates a modified form of the spring 99 of FIGURE 1.

As indicated in FIGURE 1, a fuel pump 48 is connected by a low-pressure line 51 to receive fuel from a tank 50, and discharges pressure fuel into a fuel manifold 45 leading to injection units or nozzles 70 through which fuel is sprayed into the combustion chamber or other suitable portion of the powerplant at a rate which varies with the fuel pressure. The injection units or nozzles 70 are no part of the present invention. One form thereof is described in my said parent application Serial No. 496,296.

The discharge and inlet ports of the fuel pump 48 are connected through a by-pass conduit controlled by a valve having a slidable element 72 biased toward closed position by a spring 73 and actuated by means of a bell-crank lever 74. The capacity of the pump 48 is substantially larger than the maximum fuel requirements of the powerplant, hence excess fuel is constantly flowing through the by-pass, and the fuel pressure in the manifold 45 may be controlled at will by variably positioning the valve 72. The fuel pump 48 may be driven as usual from the power-plant or engine, which is provided with an air compressor or blower 61 supplying air for combustion through a conduit or induction system 62 to one or more cylinders or combustion chambers 60. A housing 80 communicates through a large duc 81 with the air conduit 62 and contains air at compressor discharge pressure and temperature. An evacuated resilient bellows 82 in said housing acts on a lever 83 to operate a pilot valve having discs 84 and 85 which control admission of oil under pressure, through lines 87 and 88 connected to a high pressure system, to either side of piston 86, while a low-pressure line 89 is arranged to drain oil back to the sump. A floating or follow-up lever 90 is connected at its opposite ends with the pilot valve and with the piston 86, respectively, and at an intermediate point with a rod 91 connected through a variable-ratio lever mechanism 92 and a rod 93 with the bell-crank lever 74 which controls the fuel regulating valve 72.

Also included within the housing 80 there is a resilient bellows 95 which contains a definite weight of gas or other thermally expansible fluid, normally held at constant volume. The housing 80 is preferably heat-insulated, and since it is connected to the induction system 62 by means of a short conduit 81 of large diameter, eddy currents and turbulence set up by the high-velocity air flow produce an active thermal exchange, by conduction and convection, which maintains the fluid within the bellows at the same temperature as in the induction system 62. The absolute pressure in the bellows is therefore proportional to the absolute air induction temperature. The bellows 95 and a geometrically similar but evacuated bellows 96 act against each other and on a lever 97 to operate the rod 100 of a pilot valve controlling a servo mechanism 102 similar to the servo motor 86 already described in detail. Hydraulic medium is led thereto under pressure and drained therefrom as indicated by the arrows. The pressure of the air within the housing 80 acts in opposite directions on the bellows 95 and 96 thereby balancing out the effect of any change of such pressure, so that the load transmitted to the lever 97 is only dependent upon the induction temperature. The servo piston 102 operates on a lever 98 to vary the distance of the upper end of rod 93 from the fulcrum of lever 92. A follow-up spring 99 connecting the lever 98 with the pilot valve 100 balances the load transmitted by the bellows assembly 95-96 to the pilot valve and is so designed that the operating distance of rod 93 from the fulcrum of lever 92 is maintained proportional to the actual absolute induction temperature. Any change in said temperature actuates the bellows 95 and the servo mechanism 102 to rotate the lever 98 and vary the load of spring 99 until the balance of rod 100 of the pilot valve in its neutral position is restored.

The lower end of the rod 93 is provided (like the upper end thereof) with a roller, and engages the horizontal arm of the bell-crank lever 74. A lever 137 has an upper arm which is connected with the rod 93 and is arranged to vary the effective distance of the rod 93 from the fulcrum of lever 74 so as to alter the effective ratio of the bell-crank lever. The device operates as follows: the evacuated resilient bellows 82 exerts on the pilot valve 94 an upward load which is proportional to the air induction pressure. In normal operation the pilot valve 94 is maintained in equilibrium in its neutral position by a downward load of equal magnitude exerted thereon through the various elements 90-93 and 74 by the fuel pressure applied to the inner end of the regulator valve 72. Thus, for a given adjustment of levers 98 and 137, the air induction pressure (which is a measure of powerplant air flow) and the fuel pressure in the fuel manifold 45 (which is a measure of powerplant fuel flow) are proportional. Thus, if the pressure of the air in the induction system 62 decreases, due for example to climbing of the aircraft to higher altitude, the bellows 82 expands and the pilot valve 94 moves downward, draining pressure oil from the lower chamber of cylinder 86 and admitting pressure oil to the upper chamber thereof. As a result, the power piston 86 moves downward, causing through elements 90–93, counter-clockwise rotation of the bell-crank lever 74 and outward motion of the valve 72 to increase the flow of by-passed fuel. Hence the rate of powerplant fuel flow decreases, and so does the pressure in the fuel manifold 45, thus decreasing the fuel pressure load exerted upon the inner end of the valve 72 and in turn the magnitude of the downward load transmitted from the valve 72 to the pilot valve 94 in proportion to the decrease of induction air pressure, whereupon the pilot valve 94 returns to neutral position and stops the hydraulic cylinder piston 86. Conversely, an increase of induction air pressure, due for example to a descent of the aircraft to lower altitude, causes the same device to increase the fuel pressure in manifold 45 so as to increase the rate of powerplant fuel flow in the desired relation to increasing powerplant air flow.

As already stated, the lever 97 actuated by the bellows assembly 95–96 exerts upon the pilot valve 100 of the servo-motor 102 an upward load which is proportional to the induction air temperature. In normal operation, that is, under steady temperature conditions, said load is balanced by the biasing effect of the compression spring 99, and the pilot valve 100 is in neutral position. An increase of induction temperature causes a proportional increase of pressure within bellows 95 and also in the upward load applied to the pilot valve 100. Hence bellows 95 expands, the companion bellows 96 contracts, and the pilot valve 100 is lifted to a position in which the elastic reaction due to the resilient deformation of the bellows balances the difference between the upward load transmitted to the pilot valve 100 due to the fluid pressure within bellows 95 and the load of spring 99. Oil under pressure is admitted above the piston 102 of the servo-motor so as to actuate the piston and rotate the lever 98 counter-clockwise, thereby increasing the load of the compression spring 99 by an amount proportional to the increased induction temperature, whereupon the pilot valve 100 returns to neutral position and stops the piston 102. The lever 98 has a lower forked arm which is connected to the upper end of the rod 93 and is arranged to vary the distance of the rod 93 from the fulcrum of lever 92 in proportion to the variations of temperature in the air induction system 62. Thus the upward load applied by lever 92 to the rod 93 is maintained directly proportional to the absolute pressure and inversely proportional to the absolute temperaure in the induction system 62, and is therefore proportional to the air density therein. Hence, for a given position of lever 137, the structure so far described operates to maintain the pressure in the fuel manifold 45 at all times proportional to the air induction density.

Figure 6:
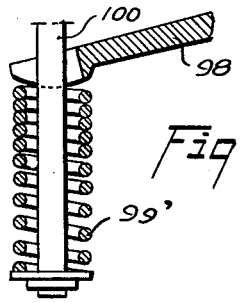

In certain engine applications it may be desirable to vary the rate of fuel flow as a different function of air temperature, for instance in inverse proportion to the square root of such temperature. Various characteristics may be obtained by using springs 99 of different designs. As indicated at FIGURE 6, the spring 99′ may be formed with uniform coil diameter and variable pitch such that within the operating range the number of free coils is inversely proportional to the spring deflection, thus causing the fuel pressure to vary in inverse proportion to the square root of the air temperature. If, on the other hand, it is preferred to use a conventional spring 99, any desired relationship between the angular position of lever 98 and the corresponding distance of rod 93 from the fulcrum of lever 92 may be obtained by resorting to a cam mechanism arranged substantially as indicated in connection with FIGURES 4 or 5.

While the arrangement described above operates to vary the fuel pressure in direct proportion to the induction air pressure or density, such relationship between fuel flow and air flow may be altered in various ways by modifying the regulator of FIGURE 1 as indicated in FIGURE 2 or in FIGURE 3. In FIGURE 2, 101 is a bellows located within the bellows 82 and vented through a passage 101′ formed in the wall of the housing 80 to atmospheric pressure, or substantially to engine exhaust pressure. The bellows 101 is placed above the lever 83 and is connected therewith so as to lower or raise the pilot valve 94 upon increase or decrease of atmospheric pressure, respectively. In FIGURE 3, instead, a bellows 103, also vented to atmospheric pressure through a passage 103′, is located below the lever 83 and is connected therewith so as to raise or lower the pilot valve 94 upon increase or decrease of atmospheric pressure, respectively. It will be appreciated, therefore, that different characteristics of fuel flow variation in response to changes of barometric pressure may be obtained by properly selecting the size and position of the additional bellows so as to suit different fuel requirements of various types of thermal powerplants.

The lower arm of lever 137 is connected through a lost motion device such as a pin engaging an elongated slot 138 formed at one end of a rod actuated by a pilot's lever 78. A tension spring 139 exerts a biasing load on the lever 137 tending to rotate the same clockwise. By operation of the manual lever 78 the pilot or operator may rotate the lever 137 so as to vary the distance of rod 93 from the fulcrum of the bell-crank lever 74 thereby controlling the ratio between fuel flow and air flow. However, such arrangement, in which the adjustment of the fuel-air ratio of the combustible mixture is left to the arbitrary choice of the pilot or engineer is not the best suitable in connection with aircraft propulsion powerplants. Accordingly, one of the objects of the invention is to provide, in combination with the previously disclosed arrangements, means responsive to one or more engine operative conditions, such as the air pressure or density in the induction manifold, the engine speed, the engine cylinder temperature, whereby the adjustment of the mixture control lever 137, and in turn the fuel-air ratio, may be automatically controlled and vary as a predetermined function of said operating condition or conditions. Operation of the engine with "best economy" mixture is possible over a certain range of power, beyond which the engine cannot safely be operated without resorting to some additional enrichment of the mixture to suppress over-heating and detonation. A temperature responsive element 130, mounted in suitable location such as on a cylinder head or near an exhaust port, is connected with a bellows 131 placed to act against an evacuated bellows 132 so that changes in the pressure surrounding the bellows act in opposite directions thereon and have no effect on their operation. Temperature changes about element 130 operate the bellows 131 and in turn the pilot valve 133 of a servo mechanism similar to those already described in detail to control the angular adjustment of lever 134, of cam 135 and to vary the load of the spring 136 acting on the pilot valve 133. An increase in temperature of the element 130 lowers the pilot valve 133 and in turn rotates the lever 134 clockwise thereby increasing the load of spring 136 until the balance of the pilot valve 133 in its neutral position is restored. The cam 135 is adapted to operate the lever 137 so that for each temperature of the element 130 it determines a corresponding predetermined minimum possible value of the fuel-air ratio. Because of the lost motion connected provided by the elongated slot 138, the temperature control device 130–136 permits manual variation of the rate of fuel flow by means of the pilot's lever 78 up to a predetermined operating temperature of the powerplant but is arranged to over-ride said lever 78 and take over control of the lever 137 at temperatures above that value in order to prevent excessive over-heating of the powerplant. Evidently, the point at which the temperature control device takes over control is dependent upon the setting of the manual lever 78.

Figure 5:
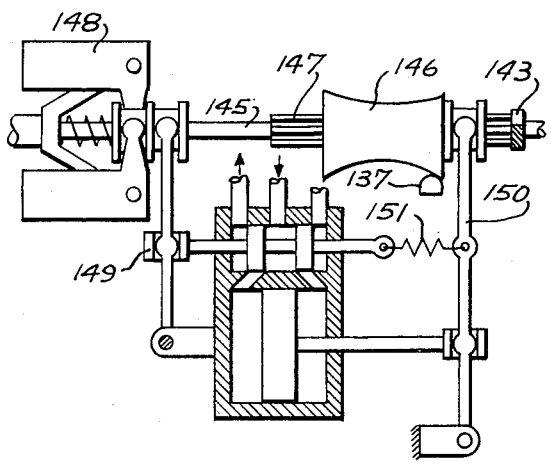

The rotatable cam actuating the horizontal arm of lever 137 may be provided with a warped or double-curvature surface, and an additional mechanism, such as indicated in FIGURE 5, may be used in order to vary the axial position of the cam. Such an arrangement makes it possible to alter the rate of fuel flow automatically as any desired function of two independent variables or parameters or operating conditions of the powerplant, said function being determined by the configuration of the three-dimensional cam. FIGURE 4 shows a rotatable cam 146 which, like the cam 135 of FIGURE 1, is adapted to engage the horizontal arm of lever 137 through a lost-motion connection. A bellows 141, evacuated totally or in part and enclosed in a housing communicating with the engine air induction system 162 on the discharge side of the compressor 61, operates a pilot valve 142 of a servo mechanism similar to those already described, whereby an increase in compressor pressure raises the pilot valve 142 and causes counter-clockwise rotation of lever 143 until the increasing load of the tension spring 144 restores the balance of the pilot valve 142 in its neutral position. Angular positioning of the cam from the lever 143 may be obtained by securing the latter to an externally splined sleeve 147 rotatably mounted on an engine driven shaft 145. The cam 146, which has a three-dimensional surface, is slidably mounted upon the splines of the sleeve 147, so that the angular setting of the cam is determined by means of the lever 143 in accordance with air induction or compressor pressure, while the axial adjustment thereof is determined by speed responsive means such as a governor 148 driven from the engine or powerplant through a shaft 145. The governor 148 controls the pilot valve 149 of a servo mechanism whereby an increase in engine speed displaces the pilot valve to the left and causes the lever 150 to rotate clockwise until the increasing load of the tension spring 151 returns the pilot valve 149 to its neutral position. The cam 146 therefore determines for each value of induction pressure and speed condition a corresponding predetermined or minimum value of the fuel-air ratio. In the preferred embodiment the cam configuration is such that in the cruising range of induction pressure and engine speed combinations such minimum value corresponds substantially to the "best economy" mixture, while for combinations of engine speed and induction pressure corresponding to higher power output the minimum fuel-air ratio obtainable will be higher than that corresponding to "best economy" mixture. Due to the lost motion connection provided by the elongated slot 138 and spring 139, the cam is adapted to over-ride the manual lever 78 and take over control of the lever 137 under predetermined speed and pressure conditions of the powerplant. The particular point at which control of lever 137 shifts from manual to automatic evidently depends upon the setting of the pilot's lever 78. And where the bellows 141 is not entirely evacuated but contains fluid, it will be actuated in response to variations not only in the induction air pressure but also in response to temperature changes.

Obviously, the structure disclosed in connection with FIGURE 1 for rotating the cam 135 with changes of temperature of the element 130 may be substituted for the structure shown in FIGURE 4 for rotating the cam 146, whereby the adjustment of the latter and in turn the engine fuel supply will vary in accordance with changes of engine speed and with variations in the temperature of element 130.

It will be appreciated from the foregoing that the fuel metering or control system above described actuates the fuel valve 72 to vary the rate of fuel flow as the product of two independent factors, or as a function of two independent variables, represented by the pull on the rod 93 and by the effective ratio of the lever 74. The system includes four main control components: an altitude control 80 as indicated in FIGURE 1 which may be modified according to FIGURES 2 or 3; a manual control 78; a temperature (or pressure) control 130 (or 141); and a speed control 148. Moreover, in the preferred embodiment disclosed herein the altitude control is constantly operating upon the rod 93, hence it determines at all times one of the factors of fuel flow, while the other factor (the ratio of lever 74) is determined either by the manual control, or by the temperature (or pressure) control, or by the speed control. And a lost-motion connection is provided whereby the manual control may be over-ridden by the temperature control and by the speed control, when predetermined values of temperature and speed conditions are reached.

These embodiments of the invention have been shown merely for purpose of illustration and not as a limitation of the scope of the invention. It is, therefore, to be expressly understood that the invention is not limited to the specific embodiments shown, but may be used in various other ways, in connection with other mechanisms and regulators, and various modifications may be made to suit different requirements, and that other changes, modifications, substitutions, additions and omissions may be made in the construction, arrangement and manner of operation of the parts without departing from the limits or scope of the invention as defined in the following claims.

Where the claims are directed to less than all of the elements of the complete system disclosed, they are intended to cover possible uses of the recited elements in installations which may not include the non-recited elements.

I claim:

1. Apparatus for controlling the supply of liquid fuel from a pump to an engine provided with an air intake system, comprising a by-pass valve movable to vary said fuel supply and arranged to be actuated upon changes in the pressure of the fuel supplied to the engine, pressure responsive means connected through a variable-ratio lever mechanism to actuate said valve in accordance to the absolute pressure of the air in a portion of said air intake system, and manually operable control means including a cam mechanism for altering the ratio of said lever mechanism.

2. In or for a fuel supply system for an engine having an air intake system: a fuel pump having inlet and discharge sides; a by-pass connecting said discharge and inlet sides; a valve controlling said bypass and movable to vary the flow of by-passed fuel, said valve being biased by the fuel discharge pressure in the direction to increase the flow of by-passed fuel; and means for applying to said valve a variable control load in the opposite direction including hydraulic servo means, a plurality of hydraulic valves for controlling said servo means, and a plurality of control components including means responsive to absolute pressure in a portion of said air intake system for actuating said hydraulic valves.

3. In a fuel supply system for an internal combustion engine, a constant capacity fuel pump, driven by the engine, for supplying fuel to said engine, a by-pass relief valve around said pump for varying the delivery of said pump, first means, responsive to engine speed and to the rate of mass air flow through said engine, for varying the opening of said valve, and means, including said first means, for automatically regulating the flow of fuel from said pump to said engine in accordance with predetermined engine operating requirements which are affected by said speed and rate of air flow.

4. A fuel control system according to claim 3, which includes means for preventing the speed and temperature of the engine from exceeding predetermined, maximum safe limits.

5. In a fuel control system for an engine having an air intake system, a fuel pump, fuel conduit means for conveying fuel under pressure discharged by said pump to the engine, a by-pass valve actuated in response to the fuel pressure in one portion of said conduit means for varying the engine fuel flow, pressure responsive means including an evacuated bellows for sensing the absolute air pressure in one portion of said air intake system and applying to said by-pass valve a control force proportional to said absolute air pressure and acting in opposition to said fuel pressure to vary the engine fuel flow in predetermined relation to said absolute air pressure, and means responsive to an engine operating temperature resulting from combustion for modifying said control force and thereby altering the fuel-air mixture ratio in predetermined relation to said temperature.

References Cited in the file of this patent

UNITED STATES PATENTS

| | | |
|---|---|---|
| 1,971,601 | Dilg | Aug. 28, 1934 |
| 2,008,143 | Mock | July 16, 1935 |
| 2,165,447 | Browne | July 11, 1939 |
| 2,306,953 | Jung | Dec. 29, 1942 |
| 2,382,707 | Gosslau | Aug. 14, 1945 |
| 2,435,902 | Reggio | Feb. 10, 1948 |